United States Patent
Boxmeyer et al.

(10) Patent No.: US 7,590,113 B1
(45) Date of Patent: Sep. 15, 2009

(54) METHOD AND APPARATUS FOR GENERATING A RECONNAISSANCE INDEX

(75) Inventors: James Boxmeyer, Flemington, NJ (US); Daniel Hurley, Marlboro, NJ (US); Carl Brian Rexroad, Oak Ridge, NJ (US); Michael Singer, Basking Ridge, NJ (US)

(73) Assignee: AT&T Corp., New York, NY (US)

( * ) Notice: Subject to any disclaimer, the term of this patent is extended or adjusted under 35 U.S.C. 154(b) by 460 days.

(21) Appl. No.: 11/323,716

(22) Filed: Dec. 29, 2005

(51) Int. Cl.
*H04L 12/28* (2006.01)
*G01R 31/08* (2006.01)
*G06F 11/00* (2006.01)

(52) U.S. Cl. ............... 370/389; 370/235; 370/242; 370/252; 726/23; 726/25

(58) Field of Classification Search ......... 370/241–253; 726/23–25
See application file for complete search history.

(56) References Cited

U.S. PATENT DOCUMENTS

| | | | |
|---|---|---|---|
| 7,089,428 B2* | 8/2006 | Farley et al. | 726/22 |
| 7,089,586 B2* | 8/2006 | Kilgore | 726/13 |
| 2003/0145225 A1* | 7/2003 | Bruton et al. | 713/201 |
| 2005/0018618 A1* | 1/2005 | Mualem et al. | 370/252 |
| 2005/0033989 A1* | 2/2005 | Poletto et al. | 713/201 |
| 2006/0045018 A1* | 3/2006 | Masri | 370/241 |

\* cited by examiner

*Primary Examiner*—Daniel J Ryman
*Assistant Examiner*—Thinh D. Tran

(57) ABSTRACT

A method and apparatus for generating a reconnaissance index for a communications network is described. In one embodiment, scan detection data is initially received. A number of scan flows and a number of unique source Internet protocol (SIP) addresses initiating said number of scan flows is then identified from said scan detection data. Afterwards, a reconnaissance index is generated by utilizing said number of scan flows and said number of unique SIP addresses.

3 Claims, 4 Drawing Sheets

METHOD AND APPARATUS FOR GENERATING A RECONNAISSANCE INDEX

BACKGROUND OF THE INVENTION

1. Field of the Invention

Embodiments of the present invention generally relate to telecommunications systems and, more particularly, to a method and apparatus for generating a reconnaissance index for a communications network, such as a packet network (e.g., an Internet Protocol (IP) network, such as is equally applicable to IPv4 and IPv6 networks).

2. Description of the Related Art

Presently, there are very few quantitative industry references that are capable of indicating the level of malicious reconnaissance or scanning activity that exists on the Internet. Any network subscriber that connects to the Internet should expect to experience some scanning activity, but the level of activity is capable of changing on a daily basis. However, the Internet subscriber does not typically have a point of reference that can illustrate what activity is prominent and how much activity should be expected. Deviations from an expected level of activity may suggest the subscriber may be targeted for attack. A significant increase in activity may have a detrimental impact to network performance, and therefore it is useful to have a measure of such activity to indicate a highly promiscuous network worm, for example.

Thus, there is a need in the art for a method and apparatus for generating a reconnaissance index that can be used to gauge the level of reconnaissance or scanning activity.

SUMMARY OF THE INVENTION

In one embodiment, a method and apparatus for generating a reconnaissance index for a communications network is described. Specifically, scan detection data is initially received. A number of scan flows and a number of unique source Internet protocol (SIP) addresses initiating said number of scan flows is then identified from said scan detection data. Afterwards, a reconnaissance index is generated by utilizing said number of scan flows and said number of unique SIP addresses.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
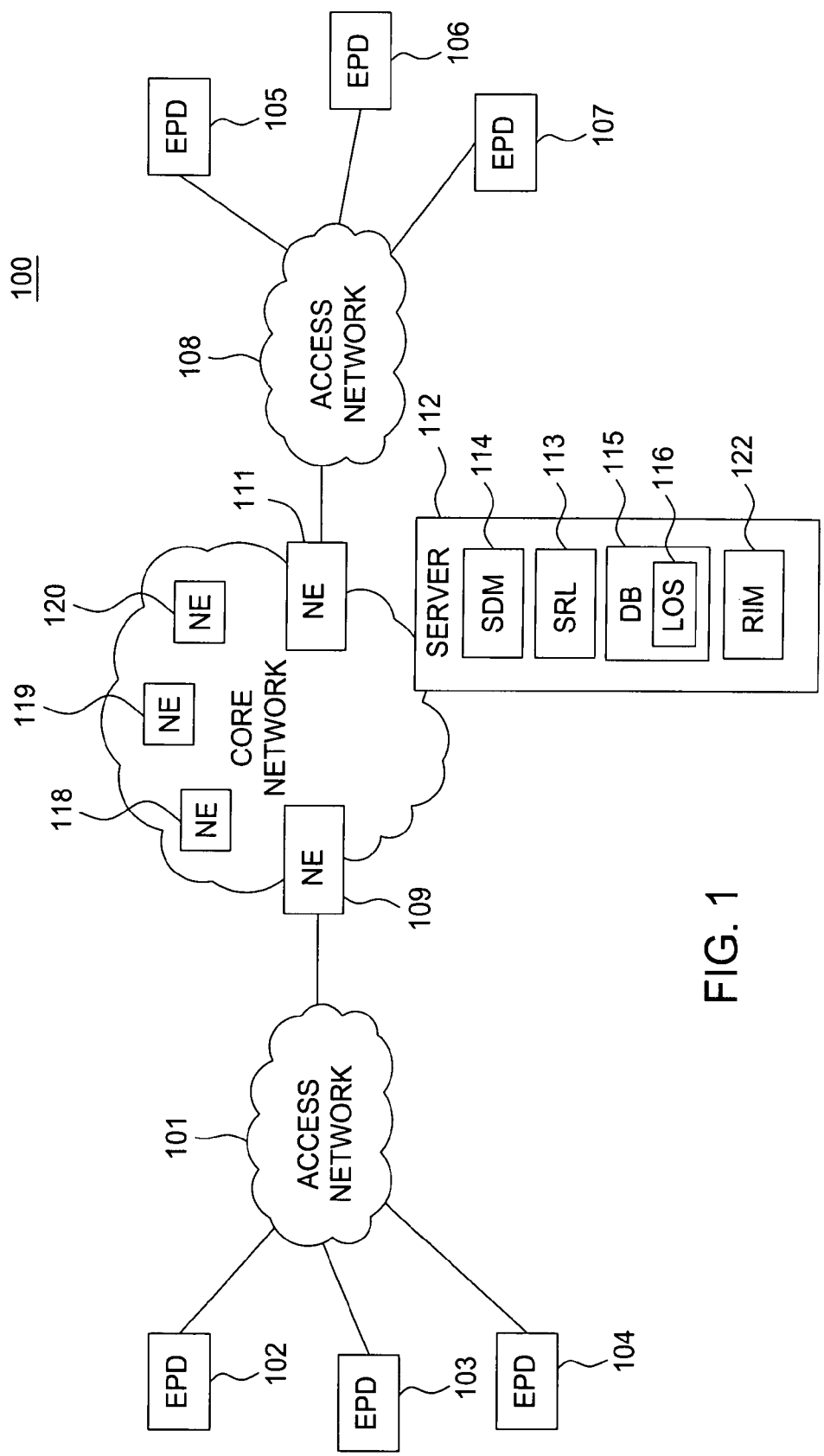
FIG. 1 is a block diagram depicting an exemplary embodiment of a communication system in accordance with the invention.

To better understand the present invention, FIG. 1 illustrates communication architecture 100 comprising an example network, e.g., a packet network related to the present invention. Broadly defined, a packet network is a network that is capable of carrying information as packetized data over an IP network. An IP network is broadly defined as a network that uses Internet Protocol to exchange data packets. Furthermore, the present invention should not be interpreted to be limited by this particular illustrative architecture. Namely, although FIG. 1 depicts an IP network, other types of networks may utilize the present invention. Generally, any large network where an observing entity is in a position to view the activity to and from the network nodes, which are free to communicate among each other, may be used to implement the present invention.

FIG. 1 is a block diagram depicting an exemplary configuration of a communication system 100 constructed in accordance with one or more aspects of the invention. A plurality of endpoint devices 102-104 are configured for communication with the core packet network 110 via an access network 101. Similarly, a plurality of endpoint devices 105-107 are configured for communication with the core packet network 110 (e.g., an IP based core backbone network supported by a service provider) via an access network 108. The network elements 109 and 111 may serve as gateway servers or edge routers for the network 110. Those skilled in the art will realize that although only six endpoint devices, two access networks, and five network elements (NEs) are depicted in FIG. 1, the communication system 100 may be expanded by including additional endpoint devices, access networks, and border elements without altering the present invention.

The endpoint devices 102-107 may comprise customer endpoint devices such as personal computers, laptop computers, personal digital assistants (PDAs), servers, and the like. The access networks 101 and 108 serve as a means to establish a connection between the endpoint devices 102-107 and the NEs 109 and 111 of the core network 110. The access networks 101, 108 may each comprise a digital subscriber line (DSL) network, a broadband cable access network, a local area network (LAN), a wireless access network (WAN), and the like. Some NEs (e.g., NEs 109 and 111) reside at the edge of the core infrastructure and interface with customer endpoints over various types of access networks. An NE is typically implemented as an edge router, a media gateway, a border element, a firewall, and the like. An NE may also include a component that resides within the network (e.g., NEs 118-120) such as a honeypot, a tarpit, a mail server, or like device. Similarly, an NE is responsible for providing flow data or flows to an application server 112. A flow (or flow data) comprises a set of packets wherein each packet of the flow is characterized by the same source IP (SIP) address, destination IP (DIP) address, source portal (sport), destination portal (dport), and IP protocol. A flow record will also include information about the number of packets exchanged, and number of bytes exchanged in a given flow. A flow may also include flag information that indicates the characteristics and status of the flow. Otherwise, various time-out rules are used to define the end of a flow.

The core network 110 also comprises an application server 112 that contains a scan detection module (SDM) 114, scan rules list (SRL) 113, a reconnaissance index module (RIM) 122, and a database 115. The application server 112 may comprise any server or computer that is well known in the art (also see FIG. 4). In one embodiment of the present invention, the server 112 comprises a dedicated application server that is configured to receive and process flow data from the network NEs in order to detect scans using the SDM 114. The database 115 may be any type of electronic collection of data that is well known in the art. The database 115 is used by the server 112 to store detected scans in a list of scans 116.

In one embodiment, the server 112 also contains a scan rules list (SRL) 113 that comprises a list of predefined scan classifications or scan types. The SRL 113 is used by the server 112 to classify the flow data in accordance to a scan type. For example, the scan type may be categorized as an A-class scan, an A-class random scan, a B-class scan, a B-class random scan, a C-class scan, a port scan, a completely random scan, and the like. These scan types may also include Internet control message protocol (ICMP) scans. Notably, each scan type classification is characterized by different characteristics or properties that may be categorized as being constant (x), distributed (*), unknown (?), or any of the previous three ("any"). For example, a C-class scan is characterized by (i) having a bytes per packet ratio that is constant (e.g., BPR=x), (ii) having a constant destination IP address for the first three octets and having a distributed fourth octet (e.g., DIP=x.x.x.*), (iii) originating from any source port (e.g., sport=any), (iv) having a constant destination port (e.g., dport=x), and (v) having a common protocol (e.g., protocol=x).

The characteristics of other non-icmp scan types include: an A-class scan (DIP=x.*.x.x, sport=any, dport=x, protocol=x, BPR=x), an A-class random scan (DIP=x.*.*.*, sport=any, dport=x, protocol=x, BPR=x), a B-class scan (DIP=x.x.*.x, sport=any, dport=x, protocol=x, BPR=x), a B-class random scan (DIP=x.x.*.*, sport=any, dport=x, protocol=x, BPR=x), a general random scan (DIP=*.*.*.*, sport=any, dport=x, protocol=x, BPR=x), and a port scan (DIP=x.x.x.x, sport=any, dport=*, protocol=x, BPR=x). Similarly, the characteristics of icmp scan types include: an A-class icmp scan (DIP=x.*.x.x, sport=any, dport=any, protocol=1, BPR=x, icmp type=x), an A-class random icmp scan (DIP=x.*.*.*, sport=any, dport=any, protocol=1, BPR=x, icmp type=x), a B-class icmp scan (DIP=x.x.*.x, sport=any, dport=any, protocol=1, BPR=x, icmp type=x), a B-class random icmp scan (DIP=x.x.*.*, sport=any, dport=any, protocol=1, BPR=x, icmp type=x), a general random icmp scan (DIP=*.*.*.*, sport=any, dport=any, protocol=1, BPR=x, icmp type=x), and a C-class icmp scan (DIP=x.x.x.*, sport=any, dport=*, protocol=1, BPR=x, icmp type=x).

The present invention provides a method for calculating the overall level of reconnaissance in a communications network (e.g., an IP network). Specifically, a reconnaissance index that serves as an indication of varying scanning activities is generated. For example, the calculated reconnaissance index may indicate the overall level of worm or virus activity on the network. In one embodiment, a RIM 122 calculates a reconnaissance index that is based on an aggregation of scan records, which are the product of a scan detection method. Notably, there are a number of methods that can be used to detect scanning activity that are known to those skilled in the art.

Figure 2:
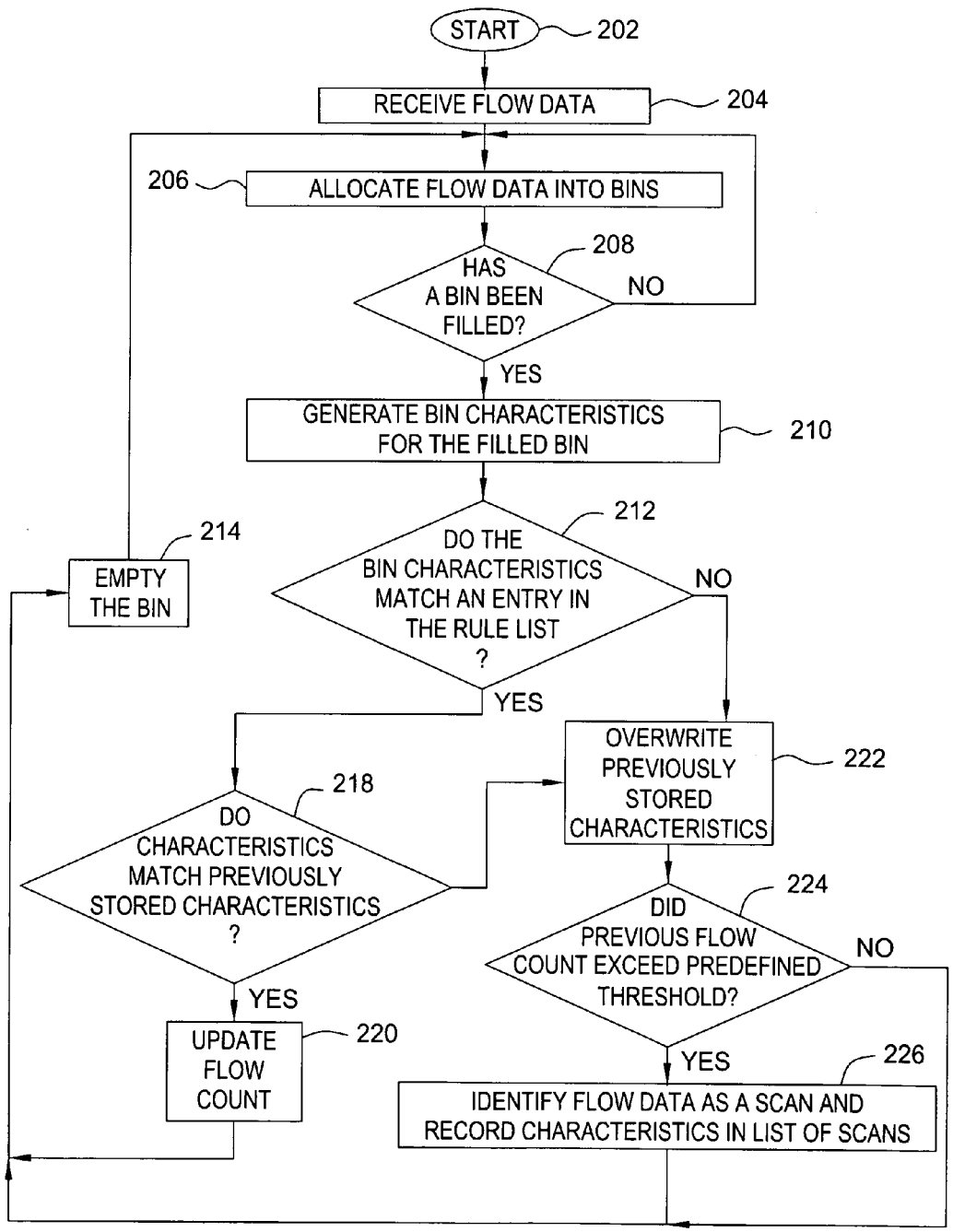
FIG. 2 is a flow diagram depicting an exemplary embodiment of a method for generating a list of scans in accordance with one or more aspects of the invention.

In one particular embodiment, scan detection data may be obtained by an exemplary embodiment as shown by a method 200 for detecting scans, which is depicted in FIG. 2. Although the present invention is described as utilizing flow-level data, the method 200 can also be used with packet-level data as well. The method 200 begins at step 202 and proceeds to step 204 where a plurality of flows (e.g., metadata) is received. In one embodiment, a NE of the core network reads in the flows and provides the flow data to the application server 112.

At step 206, each separate flow is recorded in one of a plurality of bins, e.g., in accordance to the source IP (SIP) addresses associated with the received flows. In one embodiment, the applications server 112 establishes a plurality of bins that is associated with a plurality of different SIP addresses. As separate flow data is received by the NE, the flows are allocated into the appropriate bin depending on the origin (i.e., the SIP address) of the flow(s).

At step 208, a determination of whether at least one bin has been filled. In one embodiment, a bin is filled when the number of flows reaches a predefined capacity value, MAXBIN (e.g., MAXBIN=20). If none of the bins have been filled, then the method 200 loops back to step 206 where the flows continue to be allocated into the bins. If at least one bin is filled (e.g., 20 flows have been collected), then the method 200 continues to step 210, where bin characteristics for the collective flow data (e.g., 20 flows) in the filled bin are generated. In one embodiment, the application server 112 generates the bin characteristics using the SDM 114.

In one embodiment, the bin characteristics include the source IP (SIP) address, destination IP (DIP) address, destination port (dport) ($1^{st}$, $2^{nd}$, $3^{rd}$, and $4^{th}$ octets), source port (sport), protocol, bytes per packet ratio (BPR), and icmp type (if applicable). The summary characteristics also contain additional information for meeting threshold requirement or for outputting information concerning the scans such as, starting and ending timestamps, transmission control protocol (TCP) flags, flow count, packet count, and byte count. Notably, each bin characteristic is then categorized as being constant ("x"), distributed ("*"), or unknown ("?"). For example, if most of the flows in the bin are directed to a common destination port number, the destination port characteristic would be classified as being constant (i.e., dport="x"). Conversely, if most of the flows in the bin have different destination port numbers, then the characteristic would be categorized as distributed (i.e., dport="*"). Depending on the embodiment, "most" may be defined by a predefined threshold, BINTHRESH (e.g., BINTHRESH=17), which represents a number that must be met or exceeded to properly classify a bin characteristic. For example, if BINTHRESH=17, then 17 of the 20 flows contained in the bin must demonstrate a particular quality in order to be classified (e.g., if 17 flows all have the same DIP address, then the DIP characteristic of the bin is classified as "constant"). Each of the characteristics are processed and categorized in this manner.

At step 212, the generated bin characteristics are compared to a rules list. Specifically, a determination of whether the bin characteristics match any of the entries in a scan rules list 113 is made. If no matches are found, then the method proceeds to step 222 where the previously stored bin characteristics are erased (e.g., overwritten by NULL). If a match is found, then the method continues to step 218.

At step 218, a determination of whether the bin characteristics match the previously stored bin characteristics is made. In one embodiment, the server 112 determines if the new bin characteristics match the summary characteristics of the filled bin. Namely, each bin keeps a summary of previous bin characteristics (e.g., a flow count of a particular scan class type). If the bin characteristics match the previously stored summary characteristics (i.e., the new bin characteristics are associated with the same scan type, SIP, DIP octet pattern, BPR, etc. as the previously stored summary characteristics, e.g., both characteristics correspond to the B-class type scan and have the same SIP, BPR, dport, protocol, and the same $1^{st}$, $2^{nd}$ and $4^{th}$ DIP octets) then the method 200 proceeds to step 220 where the flow count is updated. The method 200 then loops back the step 214 where the bin is emptied (but the summary characteristics are kept). If the bin characteristics do not match the previously stored summary characteristics, then the method 200 proceeds to step 222 where the previously stored summary characteristics are overwritten.

At step 224, a determination of whether the previous stored characteristics were associated with a flow count that exceeded a predetermined threshold. If the flow count exceeded a threshold (e.g., MINSCANLENGTH=100), then the method 200 proceeds to step 226 where the flow data associated with the previously stored bin characteristics are identified as a scan and the characteristics are recorded in the list of scans. In one embodiment, the characteristics (e.g., the time, duration, the number of flows, the number of packets, the number of bytes, and the ranges of each characteristic) are recorded in a list of scans 116 located in the database 115. In an alternative embodiment, the determination of whether the predefined threshold has been exceeded may be made after step 220. Namely, the flow data is classified as a scan as soon as the threshold is exceeded (e.g., as soon as 100 flow count is reached), i.e., in real time. The method 200 then loops back to step 214 where the bin is emptied and proceeds to step 206 until another bin has been filled. If the previously stored flow count does not exceed the predefined threshold, then the method 200 loops back to step 214 where the bin is emptied and proceeds to step 206 until another bin has been filled.

In one embodiment, the scan detection module produces and forwards a list of scans to the RIM 122. After receiving the scan detection data, the RIM 122 processes the data to generate a summarization of the output spanning a predefined time period (e.g., every hour, every 12 hours, every 24 hours, etc.). In one embodiment, the summarization of the data specifically includes the number of sources conducting scanning activity as well as the number of targets probed by the sources. Depending on the embodiment, the summarization data may be generated on a predefined periodic basis (e.g., hourly, daily, weekly, etc.)

Once the summarization data is generated, the RIM 122 acquires reconnaissance activity attribute data (e.g., the number of unique scanning sources and the number of probes associated with the scanning sources) from the scan detection data. In one embodiment, the RIM 122 then uses the number of unique scanning sources and the number of probes (e.g., flows) associated with the scanning sources by applying them to a reconnaissance index formula. For example, the reconnaissance index calculated from the formula typically produces a number from 0 to 100 (although it is not bound to this range) which serves as a numerical representation of the scanning activity present on the network. In one embodiment, the reconnaissance index may be represented by the equations:

$$Sources\_Index = (\{x*[(\text{weighting constant } A)*(\text{number of unique } SIPs)]\})/z$$

$$Probes\_Index = (y*[(\text{weighting constant } B)*(\text{number of scan flows})]\})/z$$

Reconnaissance Index=Sources_Index+Probes_Index therefore, $$\text{Reconnaissance index} = (\{x*[(\text{weighting constant } A)*(\text{number of unique } SIPs)]\})/z + (y*[(\text{weighting constant } B)*(\text{number of scan flows})]\})/z$$

where the weighting constant A and weighing constant B are typically values from 0 to 1.0. These weighting constants serve a number of purposes such as stabilizing the index value as aspects in the system are changed. Similarly, these weighting constants enable the system changes to remain transparent to the users of the network. In one embodiment, these constants are manually calibrated by setting the reconnaissance index to a value between 0 to 100. The number of unique SIPs represents the number of unique source IP addresses that have been found to be performing scanning activity on each protocol and protocol/port pair (i.e., a common source that is producing multiple scan records is only counted once). The number of scan flows represents the total number of probes associated with the scans. By multiplying the weighting constant A by the number of unique source IP address, a Sources_Index may be determined. Similarly, by multiplying the weighting constant B by the number of probes, a Probes_index may be determined.

The variables x and y are weighting factors that are used to specify the importance of the Sources_Index and the Probes_index respectively. In one exemplary embodiment, the weighting factors x and y are assigned values of 0.6 and 0.4, respectfully. In any case, the sum of the x and y weighting factors should always add to 1.0 in instances where these factors are utilized. Lastly, the sum of the source index and probe index is divided by an additional weighing factor, z. This weighting factor is utilized in order to accommodate the number of independent feeds (i.e., data sources) contributing to the analysis. If there is only one contributing data source, then z may be set to 1.0.

Initial weighting factors are calculated by working backward from a baseline index reference value. For example, the overall reconnaissance index may be initially defined based on a desired value (e.g., 60). The initial value selection is not significant since the purpose of the index is to provide a consistent relative reference for change over many periods of measurement. From the initial index value, two unknown values can be solved from the two following equations using basic algebra:

$$[(\text{weighting constant } A)*(\text{number of unique } SIPs)] = *[(\text{weighting constant } B)*(\text{number of scan flows})]\}$$

Figure 3:
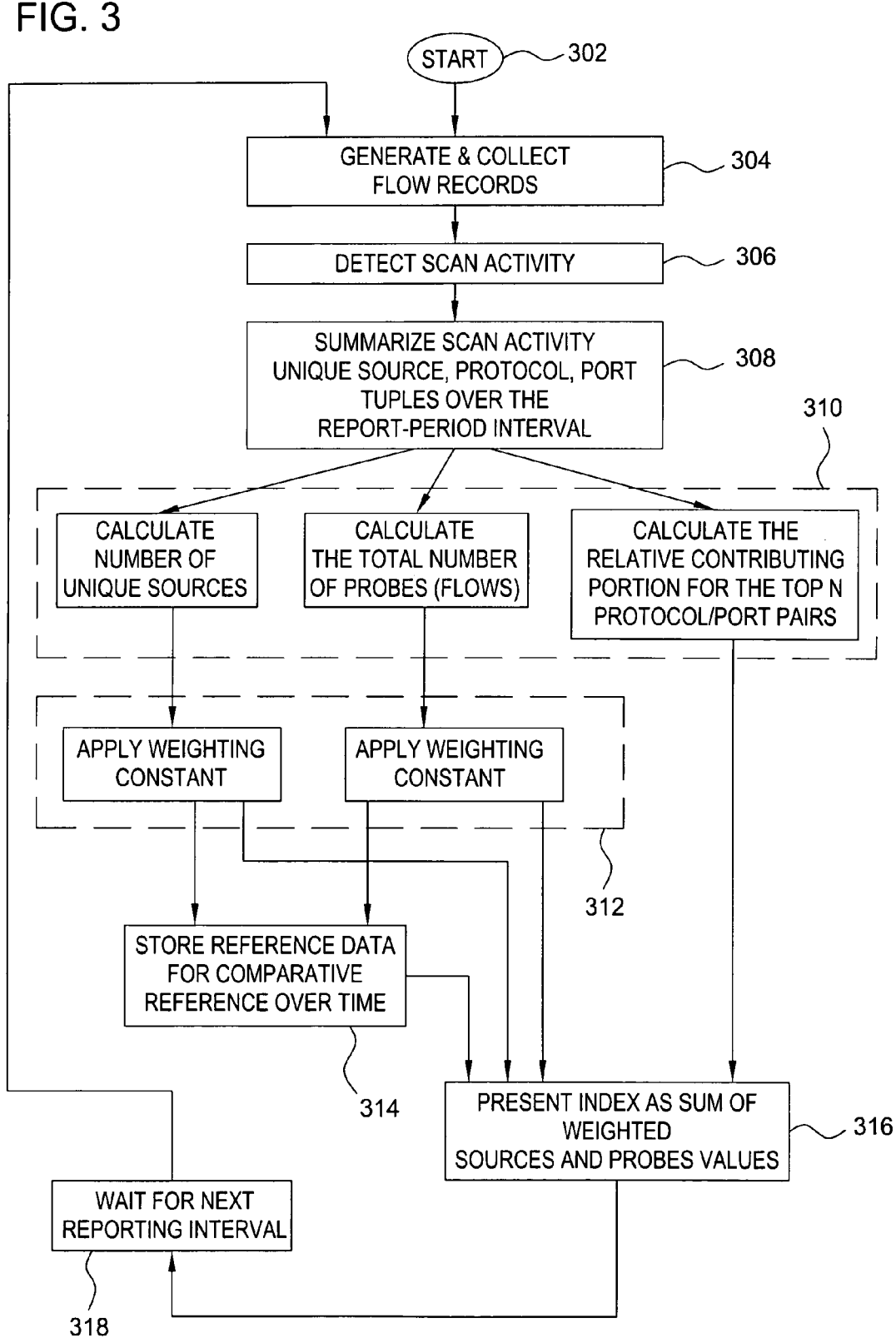
FIG. 3 is a flow diagram depicting an exemplary embodiment of a method for generating a reconnaissance index in accordance with one or more aspects of the invention.

FIG. 3 is a flow diagram depicting an exemplary embodiment of a method 300 for determining a reconnaissance index as related to one or more aspects of the invention. The method 300 begins at step 302 and proceeds to step 304 where flow records are generated and collected.

At step 306, scan activity is detected. In one embodiment, scan activity is detected by a scan detection module and is ultimately provided to a reconnaissance index module (RIM) 122.

At step 308, a summarization of scan activity is generated. In one embodiment, scan activity, unique source, protocol, port tuples are summarized over a report-period interval. More specifically, the RIM 122 identifies the number of unique source IP addresses that have been detected performing scanning activity on each protocol and protocol/port-pair. Similarly, the RIM 122 determines the number of probes (e.g., flows) associated with the scans. Notably, the summarizations are generated on a configurable periodic basis (e.g., every 30 minutes, hourly, daily, weekly, etc.) that may be predefined by a network operator.

At step 310, a parallel calculation operation is performed. In one embodiment, the number of unique sources is calculated, the total number of probes (flows) are calculated.

The relative contributing portion for the top N protocol/port pairs is calculated as well to help associate changes with index values with the specific protocols and ports that may be contributing to the change (see Table 1 below). The top N protocol/port pairs is calculated by dividing the number of sources and probes values for the specific port by the total number of sources and probes calculated for the period, respectively. The resulting fraction is multiplied by 100 to obtain the relative percentage. The resulting values are reverse sorted by the resulting percentage either by sources or by probes, and the top N values selected are elected for the table. In the example, the top 5 protocol/port pairs are selected based on sorting by the "% Share of Sources." Notably:

port "$X$" percent-probes share=100*port $x$/number of scan flows port "$X$" percent-sources share=100*port $x$/number of unique SIPs

TABLE 1

Example top scanned ports table
Top Scanned Ports for: Nov. 03, 2005
Based on AT&T Analysis

| RANK | Port/Protocol | Description | % Share of Sources | % Share of Probes |
|---|---|---|---|---|
| 1 | 445/tcp | smb | 16.20% | 12.30% |
| 2 | 6346/udp | gnutella | 16.00% | 1.40% |
| 3 | 137/udp | name-svc | 8.40% | 4.50% |
| 4 | 139/tcp | netbios-ssn | 8.10% | 7.10% |
| 5 | 41170/udp | p2p | 7.60% | 4.40% |
|  | 654-others | 654-others | 43.80% | 70.20% |

At step 312, weighting constants are applied. In one embodiment, the weighting constant A and the weighting constant B are applied to the number of unique sources and the total number of probes to determine a source index and probe index, respectively.

At step 314, reference data is stored. In one embodiment, the reference data obtained from steps 310 and 312 are stored for comparative reference over time.

At step 316, a reconnaissance index is calculated. In one embodiment, the reconnaissance index is presented as the sum of weighted sources and probes values. Specifically, the RIM 122 calculates an Internet reconnaissance index using the number of unique scanning sources and the number of probes associated with the scanning sources, e.g., the number of scan flows and the number of unique source Internet protocol (SIP) addresses initiating the number of scan flows from the received scan detection data. More specifically, this data is used as input into the formulas:

Sources_Index=({$x$*[(weighting constant $A$)*(number of unique SIPs)]})/$z$

Probes_Index=($y$*[(weighting constant $B$)*(number of scan flows)]})/$z$

Reconnaissance Index=Sources_Index+Probes_Index therefore,

Reconnaissance index=({$x$*[(weighting constant $A$)* (number of unique SIPs)]})/$z$+($y$*[(weighting constant $B$)*(number of scan flows)]})/$z$ where the weighting constant A and the weighting constant B range from 0 to 1.0. The values x and y range from 0 to 1.0 such that the sum equals to 1.0 (x+y=1.0). These factors place emphasis on the parameter that is perceived to be most important in the index. In one embodiment, the number of sources conducting reconnaissance is considered more significant than the number of probes since a large number of sources may reflect a wide-spread, self-propagating network worm infection. Therefore, in this embodiment the sources weighting factor is set to 0.6 with probes contributing 0.4 of the total index. The value Z generally is an integer value and may range from 1.0 to as many independent inputs contributing to the index value. If the contributing feeds are not completely independent, empirical analysis can be used to adjust the value of "z" to a value less than such that changes in the input feeds maintain a correct index value. In one embodiment, between 200 and 300 feeds (i.e., analyzed circuits) contributes to the index. This factor allows the index to remain relatively unaffected by network changes and/or incremental circuit interruptions that would otherwise distort the index value. For example, if the number of circuits goes from 300 to 250, the index will remain relatively unaffected. Lastly, the Reconnaissance Index typically is calibrated to range from 0 to 100, although it is not bound by the upper limit of 100 in this embodiment. At step 318, the method 300 waits for the next reporting interval and loops back to step 304.

Figure 4:
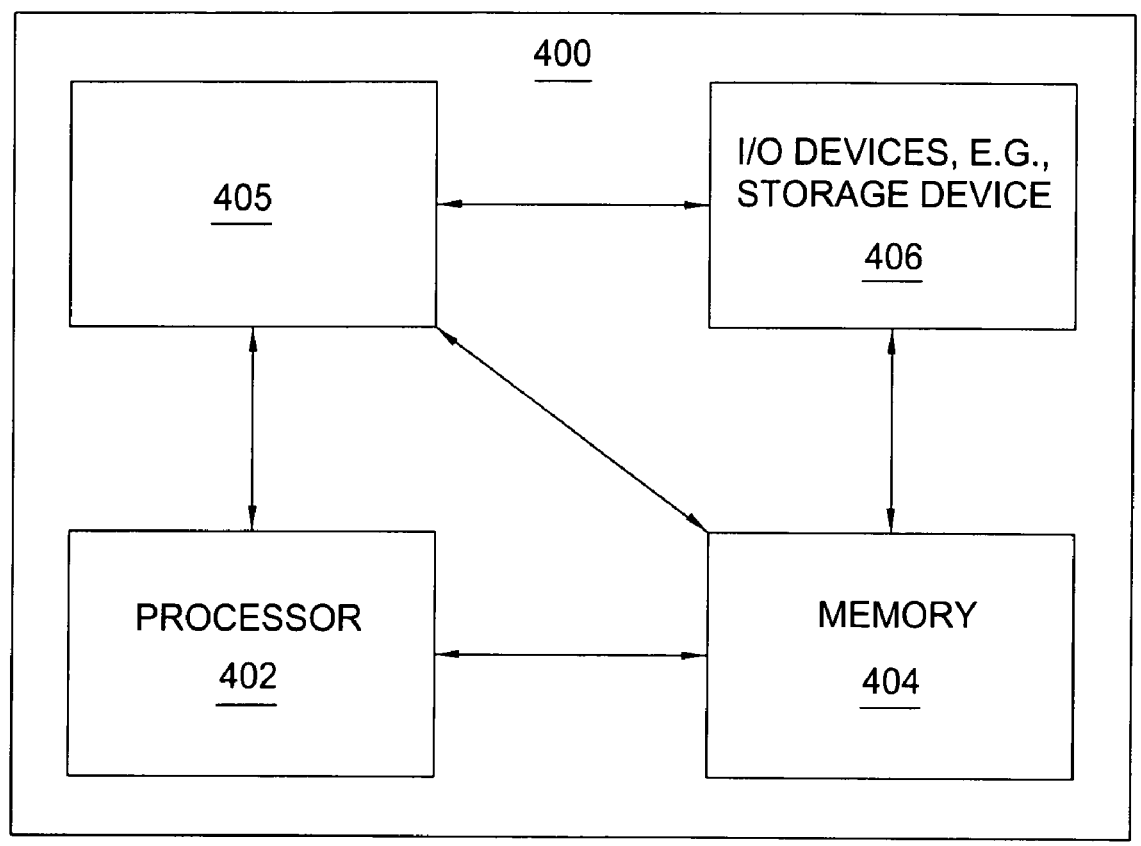
FIG. 4 is a block diagram depicting an exemplary embodiment of a computer suitable for implementing the processes and methods described herein.

FIG. 4 depicts a high level block diagram of a general purpose computer suitable for use in performing the functions described herein. As depicted in FIG. 4, the system 400 comprises a processor element 402 (e.g., a CPU), a memory 404, e.g., random access memory (RAM) and/or read only memory (ROM), a module 405 for generating a reconnaissance index, and various input/output devices 406 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in a combination of software and hardware, e.g., using application specific integrated circuits (ASICs), a general purpose computer or any other hardware equivalents. In one embodiment, the present module or process 405 for generating a reconnaissance index can be loaded into memory 404 and executed by processor 402 to implement the functions as discussed above. As such, the present process 405 for generating a reconnaissance index (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

The invention claimed is:

1. A method for generating a reconnaissance index for a communications network, comprising:

receiving, by a processor, scan detection data;

collecting, by said processor, reconnaissance activity attribute data from said scan detection data, wherein said reconnaissance activity attribute data comprises a number of scan flows and a number of unique source Internet protocol (SIP) addresses initiating said number of scan flows; and generating, by said processor, said reconnaissance index by utilizing said reconnaissance activity attribute data, wherein said generating comprises utilizing said number of scan flows and said number of unique SIP addresses to generate said reconnaissance index, and wherein said reconnaissance index is generated in accordance with:

$$Sources\_Index = (\{x*[(\text{weighting constant } A)*(\text{number of unique } SIPs)]\})/z$$

$$Probes\_Index = (\{y*[(\text{weighting constant } B)*(\text{number of scan flows})]\})/z$$

$$Reconnaissance\ Index = Sources\_Index + Probes\_Index$$

wherein said z is a weighting factor, said x is a source index weighing factor, and said y is a probe index weighing factor.

2. A computer-readable medium having stored thereon a plurality of instructions, the plurality of instructions including instructions which, when executed by a processor, causes the processor to perform the steps of a method for generating a reconnaissance index for a communications network, comprising:

receiving scan detection data;

collecting reconnaissance activity attribute data from said scan detection data, wherein said reconnaissance activity attribute data comprises a number of scan flows and a number of unique source Internet protocol (SIP) addresses initiating said number of scan flows; and generating said reconnaissance index by utilizing said reconnaissance activity attribute data, wherein said generating comprises utilizing said number of scan flows and said number of unique SIP addresses to generate said reconnaissance index, and wherein said reconnaissance index is generated in accordance with:

$$Sources\_Index = (\{x*[(\text{weighting constant } A)*(\text{number of unique } SIPs)]\})/z$$

$$Probes\_Index = (\{y*[(\text{weighting constant } B)*(\text{number of scan flows})]\})/z$$

$$Reconnaissance\ Index = Sources\_Index + Probes\_Index$$

wherein said z is a weighting factor, said x is a source index weighing factor, and said y is a probe index weighing factor.

3. An apparatus for generating a reconnaissance index for a communications network, comprising:

means for receiving scan detection data;

means for collecting reconnaissance activity attribute data from said scan detection data, wherein said reconnaissance activity attribute data comprises a number of scan flows and a number of unique source Internet protocol (SIP) addresses initiating said number of scan flows; and means for generating said reconnaissance index by utilizing said reconnaissance activity attribute data, wherein said means for generating comprises means for utilizing said number of scan flows and said number of unique SIP addresses to generate said reconnaissance index, and wherein said reconnaissance index is generated in accordance with:

$$Sources\_Index = (\{x*[(\text{weighting constant } A)*(\text{number of unique } SIPs)]\})/z$$

$$Probes\_Index = (\{y*[(\text{weighting constant } B)*(\text{number of scan flows})]\})/z$$

$$Reconnaissance\ Index = Sources\_Index + Probes\_Index$$

wherein said z is a weighting factor, said x is a source index weighing factor, and said y is a probe index weighing factor.

* * * * *